United States Patent [19]

Funato et al.

[11] 4,154,500
[45] May 15, 1979

[54] EXPOSURE OPTICAL SYSTEM FOR ELECTROSTATIC COPYING MACHINE OR THE LIKE

[75] Inventors: Hiroyoshi Funato; Nobuo Sakuma; Motoaki Kawazu, all of Tokyo, Japan

[73] Assignee: Ricoh Company, Ltd., Tokyo, Japan

[21] Appl. No.: 784,830

[22] Filed: Apr. 5, 1977

[30] Foreign Application Priority Data

Apr. 9, 1976 [JP] Japan ................... 51/40020

[51] Int. Cl.² .................. G02B 5/17; G03B 27/00
[52] U.S. Cl. .................... 350/96.25; 355/1; 362/32
[58] Field of Search ............ 350/96 R, 96 B, 96 GN; 355/1; 240/1 EL

[56] References Cited

U.S. PATENT DOCUMENTS

| | | | |
|---|---|---|---|
| 3,330,190 | 7/1967 | Taillie | 350/96 R |
| 3,898,678 | 8/1975 | Walworth | 350/96 R |
| 3,947,106 | 3/1976 | Hamaguchi et al. | 355/1 |
| 3,982,829 | 9/1976 | Hirth | 355/1 |

OTHER PUBLICATIONS

W. E. Goetz and F. L. Hajny, "Optical System for Character Recognition," IBM Tech. Disc. Bull, vol. 6, No. 8, Jan. 1964, p. 122.

*Primary Examiner*—Rolf G. Hille
*Attorney, Agent, or Firm*—David G. Alexander

[57] ABSTRACT

In an electrostatic copying machine, a light source radiates an elongated, narrow beam of light onto an original document which is moved perpendicular to the beam of light for scanning. A plurality of imaging optical fibers are arranged in a row extending coextensively parallel to the light beam, which focus images of adjacent portions of the document onto a photoconductive member which is moved in a manner conjugate to the original document for scanningly forming an image of the document on the photoconductive member. The imaging optical fibers themselves extend parallel or at an angle to the document. First and second reflectors which may be mirrors or prisms are disposed between the document and imaging optical fibers and between the imaging optical fibers and the photoconductive member respectively to deflect the optical paths of the images. The light source may comprise a lamp and illuminating optical fibers which transmit light from the lamp onto the reflector disposed between the document and imaging optical fibers from which the light is reflected onto the document, thereby protecting the imaging optical fibers from heat damage.

11 Claims, 6 Drawing Figures

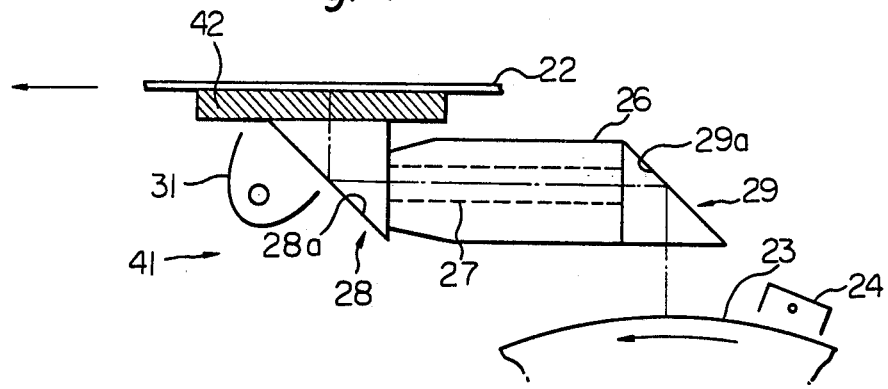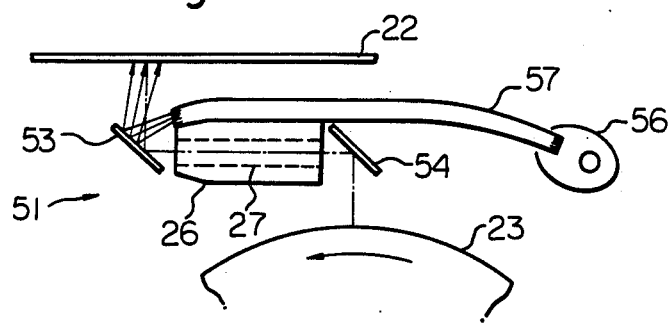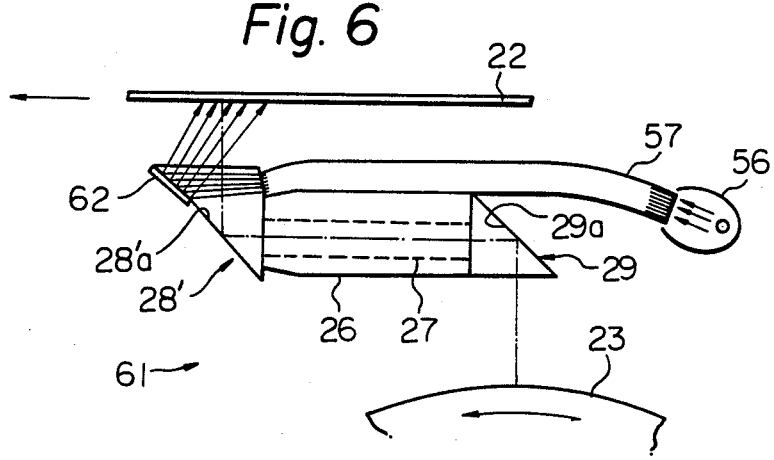

EXPOSURE OPTICAL SYSTEM FOR ELECTROSTATIC COPYING MACHINE OR THE LIKE

BACKGROUND OF THE INVENTION

The present invention relates to an exposure optical system for an electrostatic copying machine or the like.

An electrostatic copying machine typically comprises an optical system which focusses a light image of an original document on a charged photoconductive member such as a rotating drum. The light image causes localized photoconduction of the drum and forms an electrostatic image thereon. The electrostatic image is developed to produce a toner image which is transferred and fixed to a copy sheet to provide a permanent reproduction of the document.

Glass optical fibers have been developed and marketed under the trade name "SELFOC" which are formed in such a manner that the index of refraction thereof decreases parabolically in the radial direction from the central axis of the fibers. These optical fibers act as converging lenses. More specifically, if a first object is illuminated and an optical fiber of this type which is provided in the correct length is placed between the first object and a second object with distances from the opposite ends of the optical fiber to the first and second objects being equal, an erect full size image of the portion of the first object adjacent to the facing end of the optical fiber will be focussed on the second object.

In an electrostatic copying machine, these optical fibers are employed in a row in a very advantageous manner which results in reduction of the size of the exposure optical system. The row of optical fibers extends coextensively parallel to the axis of the photoconductive drum and the document and drum are moved relative to the opposite ends of the optical fibers at the same surface speed. The elongated, narrow beam of light focussed onto the drum in combination with the movement of the document and drum constitutes a scanning operation by which an image of the original document is formed on the drum.

The optical fiber system reduces the distance along the optical path of the light image from the document to the drum from several tens of centimeters to several centimeters, or by a factor of about 10. This contributes significantly to efficient space utilization in the copying machine and enables a more compact configuration.

However, due to the overall arrangement of the component parts in the copying machine it may be disadvantageous to provide the drum in such close proximity to the document without various parts of the scan drive system and other elements intervening. This drawback has precluded the widespread adaptation of focussing optical fiber arrays in the exposure systems of electrostatic copying machines, facsimile devices and the like.

SUMMARY OF THE INVENTION

In an electrostatic copying machine incorporating an exposure optical system of the present invention, a light source radiates an elongated, narrow beam of light onto an original document which is moved perpendicular to the beam of light for scanning. A plurality of imaging optical fibers are arranged in a row extending coextensively parallel to the light beam, which focus images of adjacent portions of the document onto a photoconductive member which is moved in a manner conjugate to the original document for scanningly forming a light image of the document on the photoconductive member. The imaging optical fibers themselves extend parallel or at an angle to the document. First and second reflectors which may be mirrors or prisms are disposed between the document and imaging optical fibers and between the imaging optical fibers and the photoconductive member respectively to deflect the optical paths of the images. In one form of the invention, the light source comprises a lamp and illuminating optical fibers which transmit light from the lamp onto the reflector disposed between the document and imaging optical fibers from which the light is reflected onto the document, thereby protecting the imaging optical fibers from heat damage.

It is an object of the present invention to provide an exposure optical system for an electrostatic copying machine or the like comprising an array of focussing optical fibers in which the distance between an original document and a phtoconductive drum is reduced over the prior art.

It is another object of the present invention to provide an exposure optical system comprising an array of focussing optical fibers in which the optical fiber array need not be provided directly between an original document and a photoconductive drum, thereby providing flexibility in the arrangement of component parts of an electrostatic copying machine or the like in which the optical system is incorporated.

It is another object of the present invention to eliminate heat damage to glass optical fibers in an exposure optical system and thereby ensure the clarity of a light image produced by the optical system.

It is another object of the present invention to provide increased efficiency in the utilization of space in an electrostatic copying machine and thereby reduce the size thereof.

It is another object of the present invention to provide a generally improved exposure optical system.

Other objects, together with the foregoing, are attained in the embodiments described in the following description and illustrated in the accompanying drawing.

BRIEF DESCRIPTION OF THE DRAWING

FIG. 4 is a diagram of a second embodiment of the invention;

FIG. 5 is a diagram of a third embodiment of the invention; and

FIG. 6 is a diagram of a fourth embodiment of the invention.

DESCRIPTION OF THE PREFERRED EMBODIMENTS

While the exposure optical system of the invention is susceptible of numerous physical embodiments, depending upon the environment and requirements of use, substantial numbers of the herein shown and described embodiments have been made, tested and used, and all have been performed in an eminently satisfactory manner.

Figure 1:
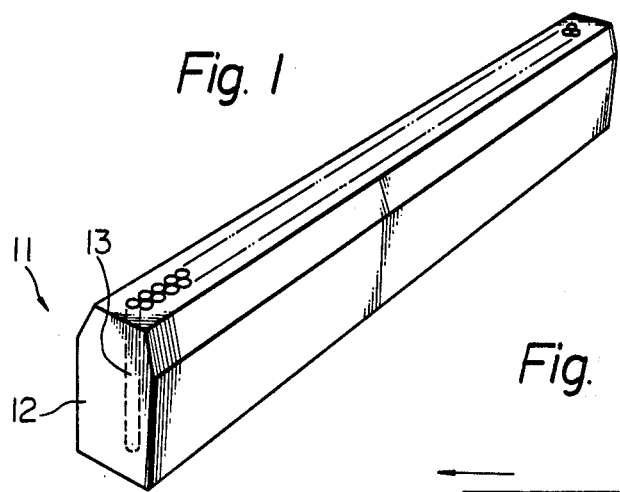
FIG. 1 is a simplified perspective view of an optical fiber array used in the present invention.

Referring now to FIG. 1 of the drawing, an optical fiber array 11 comprises a resinous block 12 which serves as a support for two staggered rows of glass imaging optical fibers 13, not all of the optical fibers 13 being individually shown and only one of the optical fibers 13 being labeled for simplicity of illustration. The array 11 of FIG. 1 is shown by way of example only, since only one or more than two rows of optical fibers 13 may be provided, although there is usually an even number of rows. However, it is important that the optical fibers 13 in the array 11 be closely packed.

The optical fibers 13 which are being marketed under the trade name "SELFOC" are formed of high quality optical glass in such a manner that the index of refraction thereof decreases parabolically in the radial direction from the central axes of the fibers 13. The fibers 13 thereby function as converging lenses and produce erect, full size images. The ends of the optical fibers 13 lie in two parallel planes.

Figure 2:
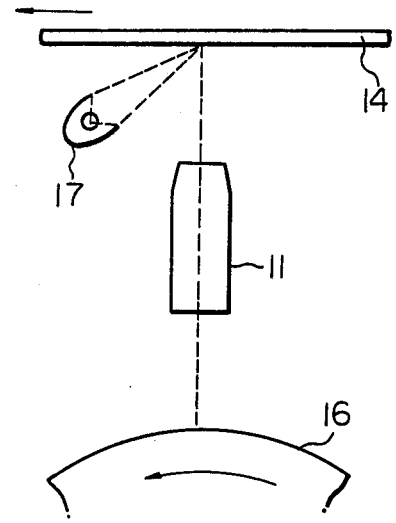
FIG. 2 is a diagram illustrating a prior art exposure optical system to which the present invention constitutes a novel improvement.

The application of such an array is illustrated in prior art form in FIG. 2. The array 11 extends perpendicular to the plane of the drawing and is disposed directly between an original document 14 and a photoconductive drum 16 which is part of an electrostatic copying machine. A lamp 17 illuminates a portion of the document 14, which faces the array 11, and the optical fibers 13 of the array 11 focus images of portions of the document 14 adjacent to the respective optical fibers 13 onto the surface of the drum 16. The lamp 17 and drum 16 are elongated parallel to and coextensive with the array 11 so that the lamp 17 forms and elongated narrow beam of light on the document 14 above the array 11. The document 14 is moved rightwardly and the drum 16 is rotated counterclockwise at the same surface speed as the document 14.

The optical fibers 13 of the array 11 function as a narrow slit through which a composite light image constituted by the individual light images of the optical fibers 13 is transmitted onto the drum 16 along an optical path indicated in broken line. Due to the combined movement of the document 14 and drum 16, a scanning operation is accomplished and an electrostatic image of the document 14 is formed on the drum 16 through localized photoconduction. This electrostatic image is developed by means of a toner substance, with the resulting toner image being transferred and fixed to a copy sheet to provide a permanent reproduction of the original document 14. Alternatively, the electrostatic image may be transferred to the copy sheet and developed.

The light images propagate or are transmitted through the optical fibers 13 in a meandering, sinusoidal pattern. In order for the image on the drum 16 to be in focus, the length of the optical fibers 13 must be an integral multiple of a predetermined value. In addition, the distances between the ends of the optical fibers 13 and the document 14 and drum 16 respectively must be precise predetermined values. Generally, these distances are equal.

Although the prior art system illustrated in FIG. 2 is capable of producing a high quality image on the drum 16, the design flexibility is extremely limited. With the distances between the optical fibers 13 and the document 14 and drum 16 being so short, a small error will result in an image which is out of focus. It is further impossible for various component elements of the drive system (not shown) which translatingly move the document 14 to be provided below the document 14 since they would collide with the array 11 or obscure the optical path. As another drawback, the distance between the document 14 and drum 16 cannot be altered, or more specifically reduced, with this inflexible prior art configuration resulting in wasted space in the area between the drum 16 and the document 14. Yet another drawback is that the optical fibers 13 must lie in a plane perpendicular to the document 14 which passes through the axis of the drum 16.

Figure 3:
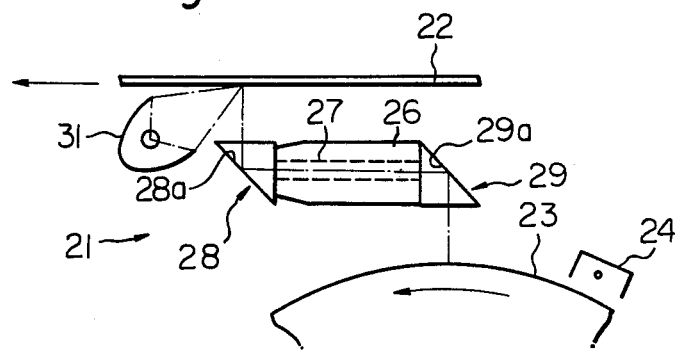
FIG. 3 is a diagram of a first embodiment of an exposure optical system according to the present invention.

These drawbacks are overcome in an exposure optical system embodying the present invention which is generally designated by the reference numeral 21 and illustrated in FIG. 3. As shown, an original document 22 is moved leftwardly and a photoconductive drum 23 is rotated counterclockwise at the same surface speed in the same manner as in the prior art. Also shown is a corona charging unit 24 for applying an electrostatic charge to the drum 23 prior to exposure.

An imaging optical fiber array 26 comprises at least one row of optical fibers 27 which correspond to the array 11. However, in the present system 21, the optical fibers 27 are arranged parallel to, rather than perpendicular to, the plane of the document 22. Right angle prisms 28 and 29 are fixed to the left and right ends of the array 26 with reflecting faces 28a and 29a oriented at 45° to the plane of the document 22. The prisms 28 and 29 are preferably cemented to the array 26 in an integral manner by means of an adhesive (not visible) having an index of refraction equal to that of the material of the prisms 28 and 29.

A lamp 31 illuminates the portion of the document 22 directly above the prism 28 to form an elongated beam of light on the corresponding portion of the document 22. Naturally, the array 26, lamp 31 and prisms 28 and 29 are coextensive with the length of the drum 23.

A light image of the illuminated portion of the document 22 is reflected by the prism 28 through the optical fibers 27 which converge the image. From the optical fibers 27, the light image is reflected from the prism 29 onto the drum 23. The length of the optical fibers 27 and the distances along the optical path of the light image (indicated in broken line) between the document 22 and the left end of the optical fibers 27 and between the right end of the optical fibers 27 and the drum 23 are selected so that the image is focussed on the drum 23. It will be understood that the prisms 28 and 29 serve as reflectors which deflect the optical path of the light image.

It will be clearly understood by those skilled in the art that in the present system 21 shown in FIG. 3 the distance between the drum 23 and document 22 can be reduced by an amount equal to the length of the optical fibers 27 thereby providing a much more compact configuration. Furthermore, the drum 23 need not be positioned so that the image thereon is directly below the illuminated portion of the document 22 as is the case in the prior art, thereby providing design flexibility for the arrangement of the various component parts of the copying machine. As yet another advantage, since the portion of the optical path between the prism 29 and drum 23 is offset from the poriton of the optical path between the prism 28 and document 22, various operating or support components of the drive system for the document 22 (not shown) may be disposed below the array 26.

Although the system 21 is shown and described with the optical fibers 27 parallel to the plane of the document 22 whereby the distance between the document 22 and drum 23 is minimized, additional design flexibility may be incorporated by rotation of the array 26 so that the optical fibers 27 are at an angle with respect to the document 22. In this case, the angles of the reflecting faces of the prisms are appropriately altered from 45°.

In FIG. 4 is illustrated a modified embodiment of the invention which is generally designated by the reference numeral 41. In the system 41, like elements are designated by the same reference numerals, and the original document 22 is adapted to be feedingly slid over a transparent platen 42. In this case, the prism 28 is advantageously fixed to the underside of the platen 42 and the lamp 31 adapted to illuminate the document 22 through the prism 28 and platen 42. This arrangement features increased rigidity against vibration and immunity to movement of the array 26, both of which conditions would result in an image which is out of focus.

In some installations of the embodiments of FIGS. 3 and 4, a problem of heat damage to the optical fibers 27 may exist. Made of high quality optical glass, the optical fibers 27 may be softened by the heat of the lamp 31. This would change the optical characteristics of the fibers 27 and cause the light image on the drum 23 to be out of focus. The embodiments of FIGS. 5 and 6 are specifically designed to eliminate this problem by spacing the lamp at a safe distance from the imaging optical fibers and transmitting light to the document 22 by illuminating optical fibers utilizing the reflector between the document 22 and imaging optical fiber array as a combination element of the illuminating system.

Such an embodiment of the invention is shown in FIG. 5 and designated as 51, in which the prisms 28 and 29 are replaced by plane mirrors 53 and 54 respectively. Although the mirrors 53 and 54 provide the same function as the prisms 28 and 29, they can be fabricated at lower cost.

Further differing from the previous embodiments the system 51 comprises a lamp 56 and a bundle of illuminating optical fibers 57 which transmit light from the lamp 56 to the mirror 53. The optical fibers 57 are provided in rows coextensively with the optical fibers 27 of the array 26. From the mirror 53, the light is reflected onto the document 22 to illuminate the same. Thus, it will be seen that the mirror 53 serves the dual functions of reflecting light to the document 22 to illuminate the same and reflecting the light image of the illuminated portion of the document 22 to the array 26.

In the embodiments of FIGS. 4 and 5, most particularly the embodiment of FIG. 4, it is preferable to illuminate the document 22 from the reflector between the document 22 and array 26 rather than directly due to the small clearances involved in practical application. The present invention provides this function with a simple but novel configuration.

FIG. 6 illustrates another embodiment of the present invention which is designated as 61 and combines the basic configuration of FIG. 3 with the lamp 56 and illuminating optical fibers 57 of FIG. 5. Again, like elements are designated by the same reference numerals where applicable. The prism 28 is modified in FIG. 6 and designated as 28'. More specifically, the prism 28' is taller than the prism 28 with a portion of the prism 28' extending above the array 26. The left ends of the illuminating optical fibers 57 are preferably cemented to this portion of the prism 28'. In operation, light transmitted through the optical fibers 57 is reflected from a reflecting face 28a' of the prism 28' to illuminate the document 22. In order to maximize the intensity of illumination, the upper portion of the reflecting face 28a' on which is incident the light from the optical fibers 57 may be silvered at its back as indicated at 62. This prevents loss of light which might occur through the face 28a' depending upon the angle of incidence of the light thereupon.

In summary, it will be seen that the present invention provides substantially expanded flexibility for the design of an electrostatic copying machine or the like incorporating an exposure optical system including focussing optical fibers, and further eliminates the problem of heat damage to the fibers. Numerous modifications will become possible for those skilled in the art after receiving the teachings of the present disclosure without departing from the scope thereof. For example, the exposure optical system of the present invention may be advantageously incorporated into a facsimile device in which the photoconductive drum of the copying machine is replaced by a light sensor array which is fixed in position and electronically scanned. The present system is generally applicable to any application where a focussing optical fiber array is provided to focus an image of a first object onto a second object.

What is claimed is:

1. An optical system for forming a light image of a portion of a first object on a second object comprising:
   a light source for illuminating the portion of the first object;
   a plurality of imaging optical fibers arranged in a row between the first object and the second object in such a manner as to transmit the light image along an optical path from the first object to the second object; and
   at least one reflector disposed in the optical path to deflect the light image and comprising a first reflector disposed between the first object and the imaging optical fibers, the light source comprising a lamp and a plurality of illuminating optical fibers transmitting light from the lamp onto the first reflector from which said light is reflected on to the portion of the first object.

2. An optical system as in claim 1, in which said at least one reflector comprises a second reflector disposed between the imaging optical fibers and the second object.

3. An optical system as in claim 2, in which the first and second reflectors comprise first and second prisms respectively.

4. An optical system as in claim 2, in which the first and second reflectors comprise first and second plane mirrors respectively.

5. An optical system as in claim 3, in which the first and second prisms are integrally mounted to opposite ends of the imaging optical fibers.

6. An optical system as in claim 5, further comprising an adhesive having a refractive index substantially equal to a refractive index of the first and second prisms which cements the first and second prisms to the ends of the imaging optical fibers.

7. An optical system as in claim 1, in which each imaging optical fiber is formed in such a manner that an index of refraction thereof decreases parabolically in a radial direction from a central axis thereof.

8. An optical system as in claim 7, in which distances from opposite ends of the imaging optical fibers to the first object and the second object respectively are equal, a length of the imaging optical fibers being selected in such a manner that the light image is focussed on the second object by the imaging optical fibers.

9. An optical system as in claim 2, in which the imaging optical fibers are straight and extend parallel to a plane defining the first object, the first and second reflectors being parallel to each other and oriented at an angle of 45° to said plane.

10. An optical system as in claim 1, in which the first reflector comprises a prism having a reflecting face, a portion of the reflecting face being silvered, the illuminating optical fibers radiating said light onto the silvered portion of the prism.

11. An optical system for forming a light image of a portion of a first object onto a second object comprising:

a light source for illuminating the portion of the first object;

a plurality of imaging optical fibers arranged in a row between the first object and the second object in such a manner as to transmit the light image along an optical path from the first object to the second object;

at least one reflector disposed in the optical path to deflect the light image and comprising a first reflector disposed between the first object and the imaging optical fibers and a second reflector disposed between the imaging optical fibers and the second object, the first and second reflectors comprising first and second prisms respectively; and a transparent platen for supporting the first object, the first prism being fixed to the platen, the light source illuminating the first object through the first prism and the platen.

* * * * *